United States Patent
Romy (10) Patent No.: US 7,145,909 B2
(45) Date of Patent: Dec. 5, 2006

(54) PACKET SWITCHING ACCESS PLATFORM

(75) Inventor: Neil J. Romy, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1031 days.

(21) Appl. No.: 10/155,270

(22) Filed: May 24, 2002

(65) Prior Publication Data

US 2003/0219021 A1    Nov. 27, 2003

(51) Int. Cl.
*H04L 12/00*    (2006.01)

(52) U.S. Cl. ............... 370/395.1; 370/419; 370/163; 709/249; 709/251; 709/252; 709/253

(58) Field of Classification Search ............ None
See application file for complete search history.

(56) References Cited

U.S. PATENT DOCUMENTS

| | | | | |
|---|---|---|---|---|
| 5,404,352 A | * | 4/1995 | Pauwels et al. ............ | 370/390 |
| 5,774,665 A | * | 6/1998 | Jeong et al. ............ | 370/395.53 |
| 5,889,850 A | * | 3/1999 | Sochacki ............ | 379/329 |
| 6,611,523 B1 | * | 8/2003 | Tanaka et al. ............ | 370/395.5 |
| 6,741,599 B1 | * | 5/2004 | Dunn et al. ............ | 370/395.6 |
| 6,888,849 B1 | * | 5/2005 | Daniels ............ | 370/485 |
| 7,009,939 B1 | * | 3/2006 | Baker et al. ............ | 370/252 |
| 2002/0172220 A1 | * | 11/2002 | Baker et al. ............ | 370/465 |
| 2003/0202520 A1 | * | 10/2003 | Witkowski et al. ............ | 370/400 |

* cited by examiner

*Primary Examiner*—Hassan Kizou
*Assistant Examiner*—Brian Roberts (57) ABSTRACT

This invention relates to apparatus and associated methods for providing access to and switching of information in a packet data network. More particularly, the invention is directed to a platform facilitating both packet switching capabilities and associated access interface functions in a single system.

18 Claims, 6 Drawing Sheets

FIG. 7b
CENTER STAGE CONFIGURATION

FIG. 7a
DUAL RING CONFIGURATION

PACKET SWITCHING ACCESS PLATFORM

TECHNICAL FIELD

This invention relates to methods and apparatus for providing access to and switching of information carried in a packet data network.

BACKGROUND OF THE INVENTION

This invention relates to apparatus and associated methods for providing access to and switching of information in a packet data network. More particularly, the invention is directed to a platform facilitating both packet switching capabilities and associated access interface functions in a single system. While this invention is directed to such an art and associated techniques, and will be specifically described in connection therewith, it is to be appreciated that the invention will also have usefulness in other fields and applications.

By way of background, packet switching can be generally defined as the movement and processing of data packets generated by selected components within a system or collection of networked processors. As such, the overall functions of packet switching are to 1) bring packetized data into and out of the system, 2) generate packetized data within the system, and/or 3) process packetized data within the system. Packet switching is implemented using specified protocols for computer-to-computer communications, as is well known in the art of data management and communications. Additionally, some applications of packet switching also manipulate packetized voice and video data.

Packet switching units are finding particular application in connection with large telecommunication switches. Typically, a packet switching unit is connected to a circuit-based switching module of a larger telecommunication switch. It processes data and/or forwards it on to the switching module.

There are disadvantages to these typical, known packet switching units. First, packet switching units typically have a physical layout comprising a plurality of elements spanning shelves of a hardware interconnection. Second, packet switching units may have a multilayer hierarchy of distribution points which allow different elements, or cards, to communicate with one another. However, such a tiered hierarchy does not permit the most efficient or the most reliable communication.

In the current art, the switching module also has associated therewith an access interface unit which may also be associated with one or more other switching modules. The interface unit performs access interface functions and brings information into the system from outside sources such as phone lines, trunks, etc. and moves such information into the switching module.

Accordingly, a more efficient packet switch unit is desired. In this regard, a packet switch unit that handles both packet switching and access interface functions for connections such as optical links, T1 links, high speed lines, and ethernet and/or ATM interfaces would be useful.

The prior art does not teach an efficient arrangement for the combination of packet switching and access in such a manner to fully take advantage of both. The above problems are solved and an advance is made over the teachings of the prior art through the combination of the packet switching and access functionality.

SUMMARY OF THE INVENTION

The invention is directed to a platform facilitating both highly reliable packet switching and associated access interface functions in a single system. This system utilizes a duplex, fault tolerant asynchronous transfer mode (ATM) fabric and a collection of application packs in which each application pack (AP) functions as a processing elements or as an access interface element. All application packs, whether processing or access interface elements, are connected in a tightly knit formation around the duplex fabric, i.e. to form a highly reliable duplex star configuration.

In another aspect of the invention, the ATM fabric may be configured as simplex, at the expense of providing lower reliability and lower fault tolerance.

In another aspect of the invention, pseudo-dedicated ingress and egress points are provided by way of a select pairs of application packs, configured in a fault tolerant, automatic protection switched (APS) arrangement, that serve as a high speed access interface relative to other lower speed access interfaces. This high-speed access interface utilizing, but not limited to, either ATM transport or Ethernet transport, may be viewed as a primary ingress and egress point into the system, while the lower-speed access interfaces utilizing, but not limited to, ATM transport, Ethernet transport, or time division multiplexed (TDM) transport transferred at a data rate lower than that used by the high-speed access interface, may be viewed as secondary ingress and egress points.

In another aspect of the invention, the high-speed access interface may be configured as a simplex ingress and egress point, at the expense of providing lower reliability and lower fault tolerance.

In another aspect of the invention, the high-speed access interface may be eliminated, with the circuit pack positions previously used by the high-speed access interface being replaced with other application packs, and with primary ingress and egress to the system limited to one or more lower-speed access interfaces.

In another aspect of the invention, pairs of application packs have the ability to work in unison through dedicated mate update busses whereby, for example, one application pack shares a processing load with a mated application pack. Other modes of the use of the mate update busses are also comtemplated.

In another aspect of the invention, external control of the system, if desired or required, may be achieved through a number of various means, including but not limited to access via a connection associated with each of the duplex fabric packs, access via a control channel virtual circuit connected via the high speed access interface, or access via a low speed control channel connected to a low speed access interface.

In another aspect of the invention, the connection associated with each of the duplex fabric packs allows for the transfer of incoming and outgoing data between the external interface and the internal fabric, as well as for a control channel connection.

In another aspect of the invention, configured with no external control mechanism, internal control of the system can be facilitated by a duplex, fault tolerant pair of application packs called management processors. This management processor (MP) subsystem provides overall control of the system in such configurations.

In another aspect of the invention, due to the inherent design and fault tolerance of the herein described invention, a multitude of these systems may be arranged in multiple fashions so as to provide a self-contained, highly fault tolerant, packet switching and access network. In one such fashion, the high-speed access interfaces are arranged in a dual ring configuration, with such an arrangement able to withstand multiple faults before a service-affecting failure in the network occurs. In another such fashion, a hierarchy of systems is arranged in such a fashion so as to provide a single, highly fault tolerant, high-speed ingress and egress point to the network system, while still providing a distributed low-speed access and protocol processing network.

Further scope of the applicability of the invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination of the various parts of the device and or steps of the method, whereby the objects contemplated are attained as hereinafter more fully set forth, specifically pointed out in the claims, and illustrated in the accompanying drawings in which:

DETAILED DESCRIPTION OF THE DRAWINGS

Figure 1:
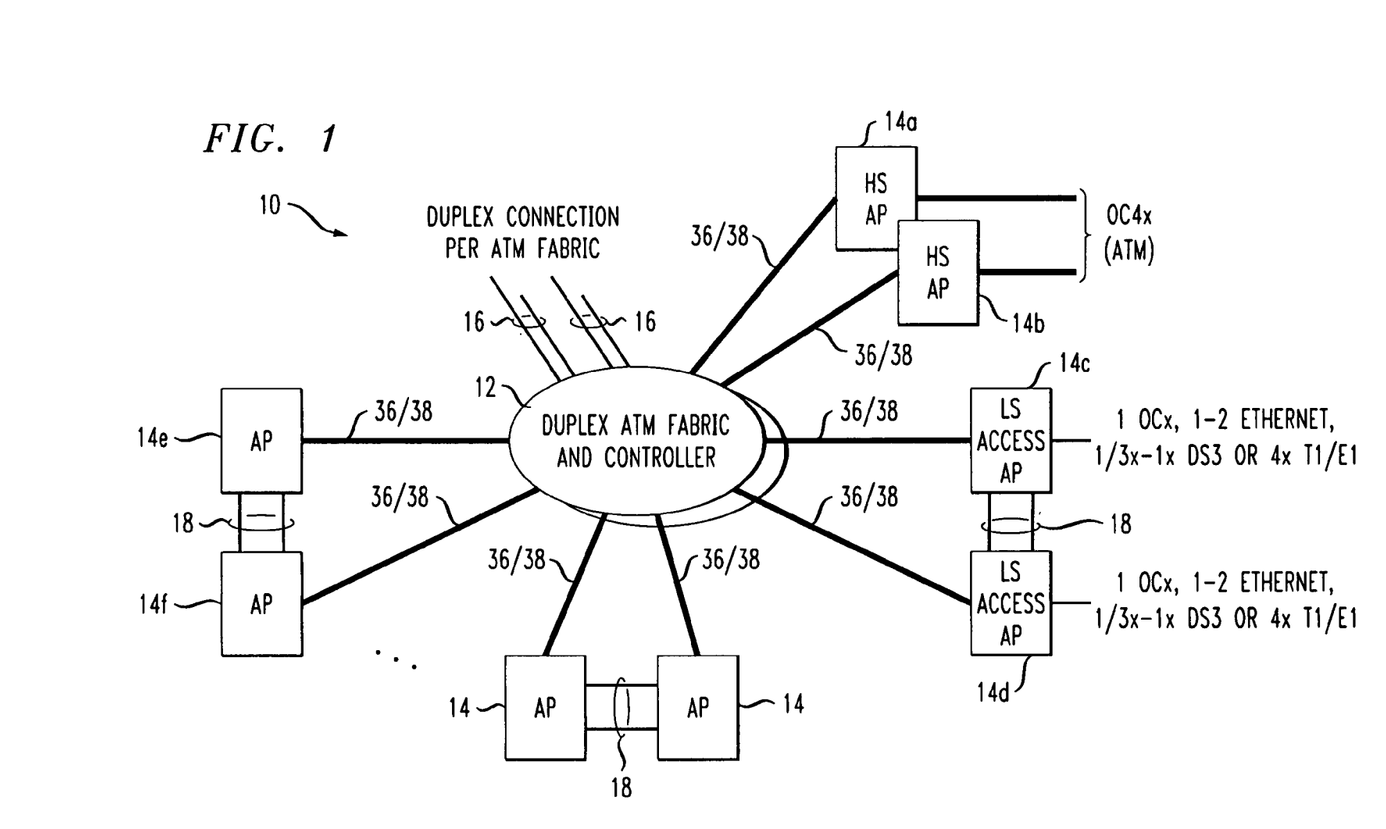
FIG. 1 presents a high-level block diagram of invention.

Referring now to FIGS. 1–7 wherein the showings are for purposes of illustrating the preferred embodiments of the invention and not for purposes of limiting same, FIG. 1 presents a block diagram illustrating an overall logical view of the invention. As shown, the system 10 is comprised of a duplex, fault tolerant asynchronous transfer mode (ATM) fabric and controller 12 which is tightly coupled through lines 36/38 to a plurality of application packs 14. The application packs 14 (including packs 14a, 14b, 14c, 14d, 14e, 14f) are connected to the fabric and controller 12 in a star configuration.

It is to be appreciated that the implementation of this star configuration allows for a variety of different uses for the system i 0. Selected implementations will be described herein; however, it should be appreciated by those skilled in the art that such a star configuration may be used in a variety of telecommunication applications. It should further be appreciated that the components of the star configuration of system 10 and the components that connect thereto or communicate therewith have many features that are well known to those versed in the art. As such, not all such features will be described herein.

A preferred use of these application packs 14 is to terminate, originate, or otherwise manipulate a computer data stream transferred to and/or from the fabric and controller 12. The data stream may be comprised of, but not limited to, any combination of voice data, video data, or computer protocols (e.g. TCP/IP). Such data streams may originate external to the system 10 or internal to the system 10, or may be wholly exchanged by multiple application packs 14 within the system 10. Though delivered via an ATM transport mechanism, the data stream may contain any combination of synchronous or asynchronous content, using means well known in the art.

Significantly, two of the application packs 14 preferably serve as high speed access application packs (e.g., packs 14a & 14b). The pair is preferably arranged in an auto protection switched (APS) configuration for high reliability. These high speed access application packs 14a & 14b preferably provide a bandwidth of at least four times the bandwidth of low speed access application packs (e.g., packs 14c & 14d) of the same transport protocol. For example, for a low speed access bandwidth of 155 Mb/s (e.g. OC3 rate), the high speed access is preferably at least 622 Mb/s (e.g. OC12 rate). Alternatively, for a low speed access bandwidth of 100 Mb/s (e.g. Fast Ethernet), the high speed access bandwidth may be in the range of 1 Gb/s (e.g. Gigabit Ethernet). This preferred embodiment does not imply that the invention must be limited to any such ratio of low speed access bandwidth compared to high speed access bandwidth, but rather merely suggests a typical ratio. Indeed, it may be desirable in certain circumstances to only provide high speed access. Alternatively, it may be desirable for only low speed access to be provided.

In addition, referring to FIG. 1, an association of the fabric and controller 12 to a duplex connection 16. Such a connection provides one embodiment of a mechanism by which control of the entire system 10 can be managed through a virtual circuit and either a high or low speed interface to allow for transfer of data and control information. The ATM fabric may also be of a simplex configuration. Alternatively, the mechanism provides a way in which shared control of the system 10 can be managed, with the portion of the control not managed externally being managed by specially dedicated application packs as will be described in FIG. 6 below.

Also shown in FIG. 1 is a feature of the invention whereby sequential adjacent pairs of application packs can be mated to create a tightly coupled arrangement in the pair. This mating, which occurs via update busses 18, advantageously provides three modes of mating operation which facilitates the ability of the mated pair to accommodate higher-speed connections and/or greater processing capability than provided by individual application packs 14. It should be appreciated that these modes of operation may be selectively implemented on a pair-by-pair bases or system-by-system basis. The selection of modes for the pairs of application packs may be implemented in ways that will be apparent to those skilled in the art.

The first mode provided by utilizing the mating of application packs 14 is a cache-write-through mode, wherein each of the pair of application packs 14 mirror the memory of the one another to effect high reliability of the system 10. If one of the pair fails in such a duplex configuration, the other can quickly and efficiently assume the processing duty upon recognition of signaling that indicates such failure.

The second mode of mating operation is a copy-over mode, whereby a bulk transfer of information is facilitated between the mated pair without utilizing the bandwidth of the shared fabric. Such a bulk transfer can allow the mated pair to effectively operate in an active/standby fashion, where a failing one of the pair can quickly and efficiently transfer critical data to the mate before complete failure occurs. Again, the failing pack or a system manager indicates to the non-failing mate that the transfer will occur. In such a configuration, the pair does not function in a tightly coupled fashion, but rather a loosely coupled fashion.

The third mode of mating operation allows for selective read/write operations from the memory of one of the mated pair to the memory of the other, effectively implementing an efficient multiprocessor configuration. Such a configuration can allow for, in one embodiment of the invention, a load shared function whereby one of the mated pair may function to transmit data via a connection to an external device while the other of the pair may function to receive data via a similar such connection to the same external device, hence allowing the processing of double the capacity allowed for by a single application pack 14. Alternatively, in another embodiment of the invention, the load sharing may be implemented in such a fashion where one of the mated pair may function to transmit data via a connection to an external device while the other of the pair may function to receive data via a dissimilar connection to a distinctly different external device. Such an arrangement can be fashioned to work with another similarly mated pair to achieve a full duplex communication path wherein each direction of the data flow is a high capacity, highly reliable connection.

Figure 2:
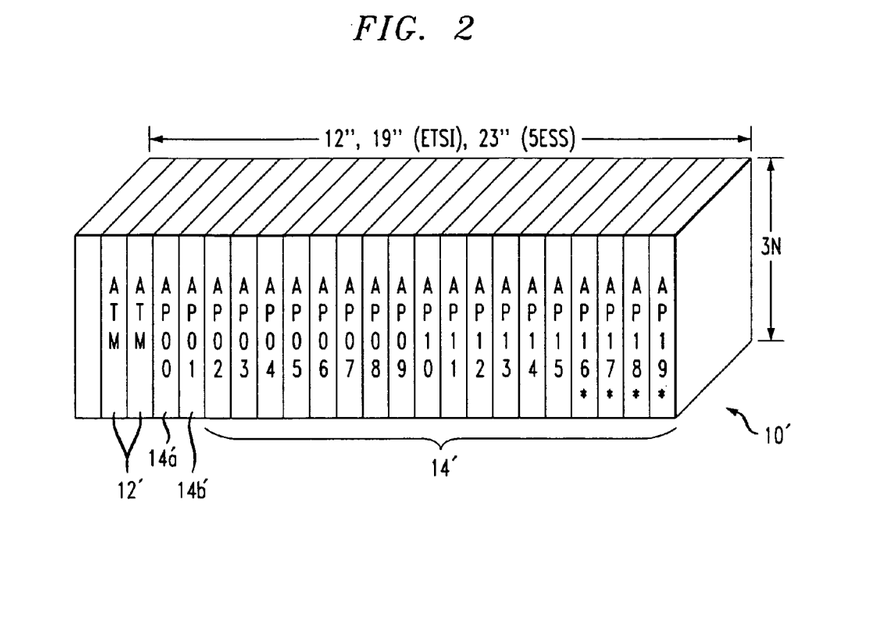
FIG. 2 shows a typical physical packaging of a packet switching access platform according to the present invention.

With reference to FIG. 2, the packet switching access platform may, as an example, be implemented in the form of communication cards. It is to be appreciated that the platform 10' may be incorporated into a switching module of a large telecommunications switch, as is well known in the art. It is to be further appreciated that the platform 10' preferably only fills the physical space of a single shelf within the module. As noted above, the prior art configuration may use a plurality of shelves of physical space within the module.

As shown, the platform 10' is comprised of a dual ATM fabric and controller 12' and application packs 14'. As described above, application packs 14a' and 14b' serve as high speed access application packs. The other application packs 14' serve the functions and are configured as described in connection with, for example, FIG. 1. It is to be appreciated that the mate update bus 18 (not shown) connect the application packs in an appropriate manner on the shelf. Likewise, control lines 36 (not shown) and transmission lines 38 (not shown) also connect the fabric and controller 12 of each of the application packs 14.

Figure 3:
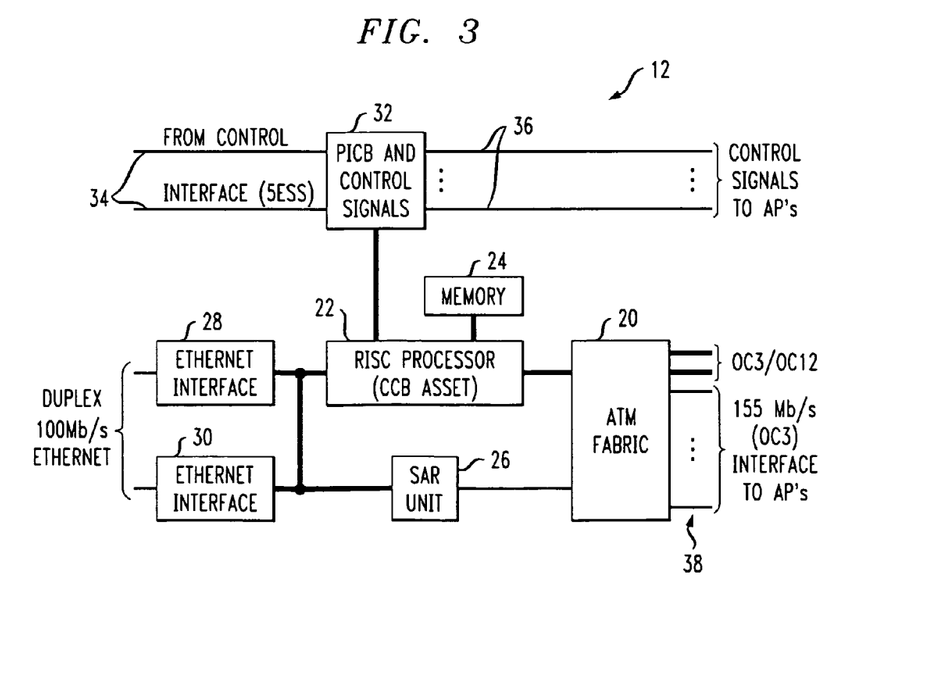
FIG. 3 shows a hardware configuration of the fabric/controller shown in FIGS. 1 and 2.

Referring now to FIG. 3, an illustration of typical components of the fabric and controller 12 (or 12') is provided. It is to be understood that the components of the fabric and controller 12 operate in manners that will be understood in the communication field. However, these components will also operate in accord with this invention to accommodate the configuration, features, and interfaces described herein. Specifically, the fabric and controller 12 comprises ATM fabric 20 which is connected to a processor 22, preferably a reduced instruction set computer (RISC) processor, which, in turn, is connected to a memory 24. The fabric 20 is also connected to a segmentation and reassembly (SAR) unit 26. Ethernet interfaces 28 and 30 connect to the processor 22 and the SAR 26. In addition, a control signal interface unit 32 is connected to the RISC processor 22.

Also shown in FIG. 3 are transmission lines 34 which connect the unit 32 to a control interface of a module, e.g. a switching module, connected on an ethernet. As illustrated, the control lines 36 connect the unit 32 to the other application packs of the system and the transmission lines 38 connect the fabric 20 to the other application packs.

Figure 4:
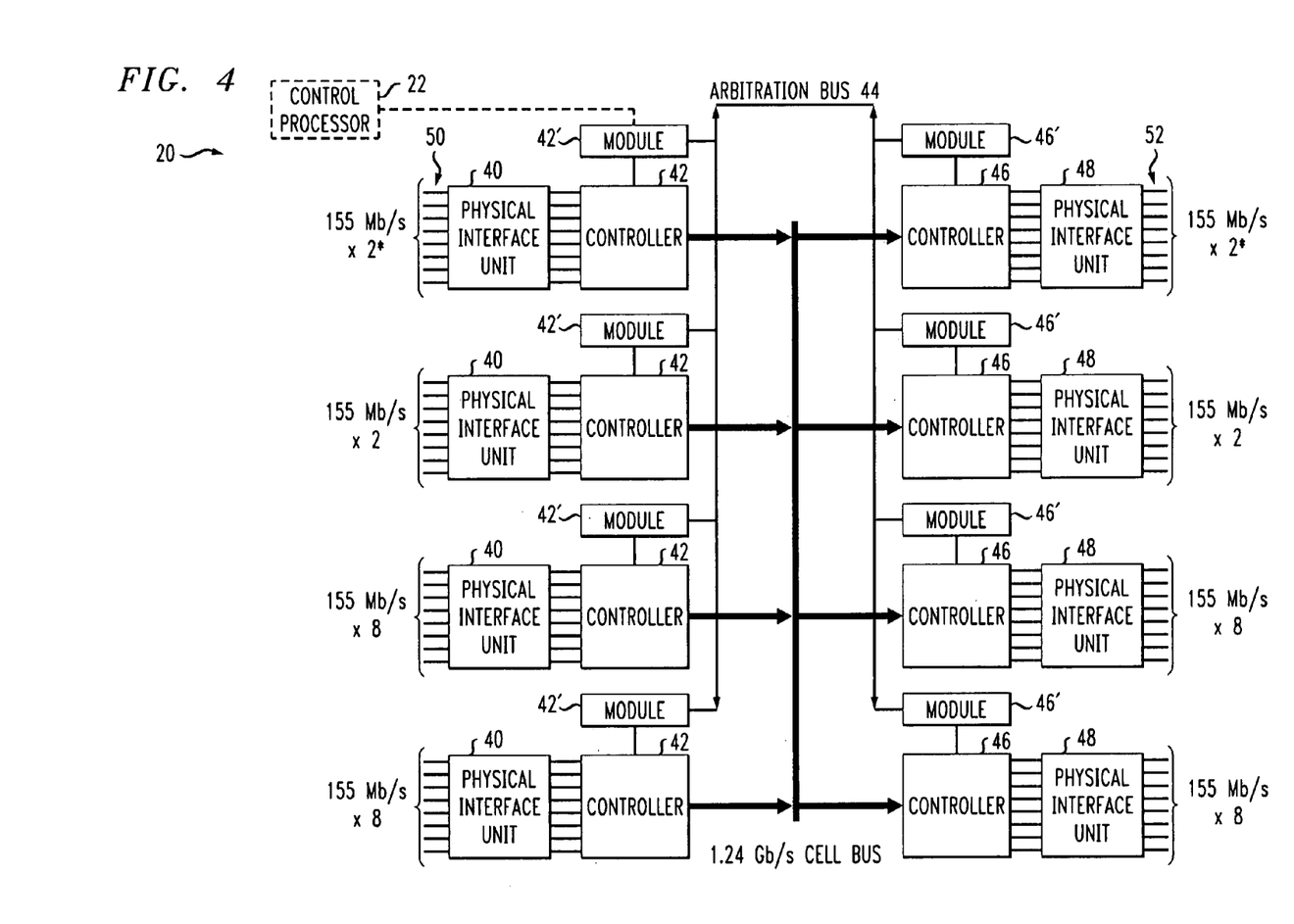
FIG. 4 shows a detailed block diagram of an exemplary fabric according to the present invention.

Referring now to FIG. 4, an example of an implementation of the fabric 20 is shown. As illustrated, the processor 22 connects to the fabric 20 as shown in FIG. 3 and as those skilled in the art will appreciate. The fabric 20 comprises a plurality of physical interface units 40 that connect to controllers 42. The controllers 42 (and associated modules 42') connect to an arbitration bus 44 that, in turn, connects to controllers 46 (and associated modules 46') which are connected to physical interfaces 48. Note that the lines connecting to the interfaces 40 and 48 are 155 Mb/s lines—although to accommodate the high speed access application packs 14a and 14b (in the embodiment described in connection with FIGS. 2(a) and (b), for example), selected groups of lines (e.g. 50 and 52) are expandable to accommodate 622 Mb/s.

The fabric 20 may take a variety of configurations. Nonetheless, it preferably serves, along with the corresponding control architecture of FIG. 3, as the center of the star configuration of application packs. As such, the fabric 20 is a centralized switching element that handles flow of packets within the system. Although, as noted above, pairs of application packs are mated and are capable of point-to-point communication, the fabric 20 is central to all processor (application pack) interactions.

Figure 5:
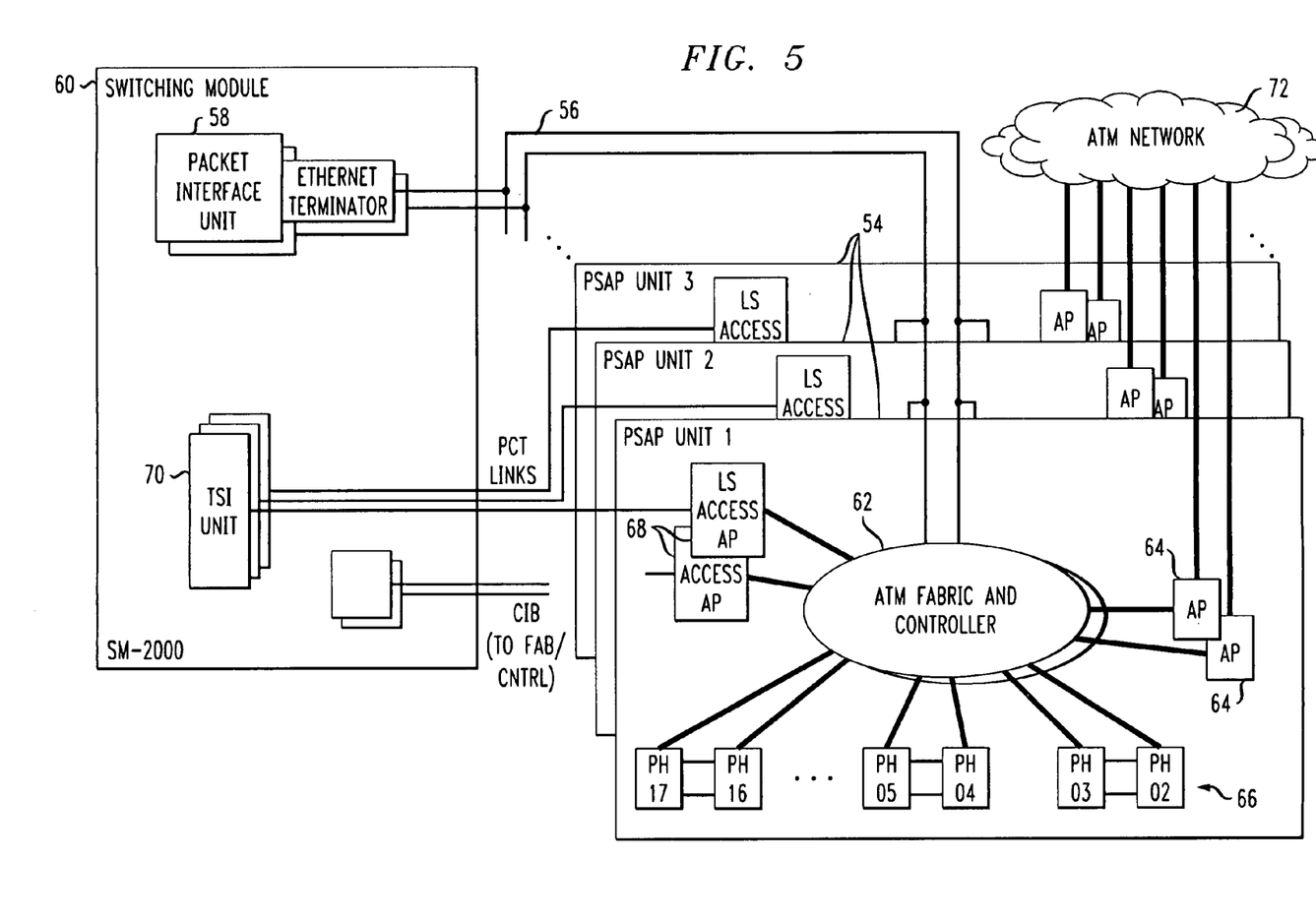
FIG. 5 shows a packet switching access platform according to the present invention integrated with a switching module.

Referring now to FIG. 5, a packet switching access platform according to the present invention is illustrated as being integrated into a switching module of a larger telecommunications switch, such as the 5ESS® switch. This, of course, is simply an example of an implementation of the invention.

More specifically, a plurality of packet switching access platform (PSAP) units, or subsystems, 54 are connected through an ethernet control bus 56 to a device called a packet interface unit 58 which resides in a switching module 60. The switching module 60 provides high level control and coordination of activities within the rest of the telecommunications switch (not shown) as will be appreciated by those skilled in the art. Each packet switch access platform 54 includes a fabric and a controller 62, high speed access application packs 64, protocol handler application packs 66 that are mated, and low speed application packs 68. The low speed access application packs 68 connect to the switching module 60 through time sliced integration (TSI) units 70. The high speed access application packs 64 connect the fabric and controller units 62 to an ATM network 72.

Figure 6:
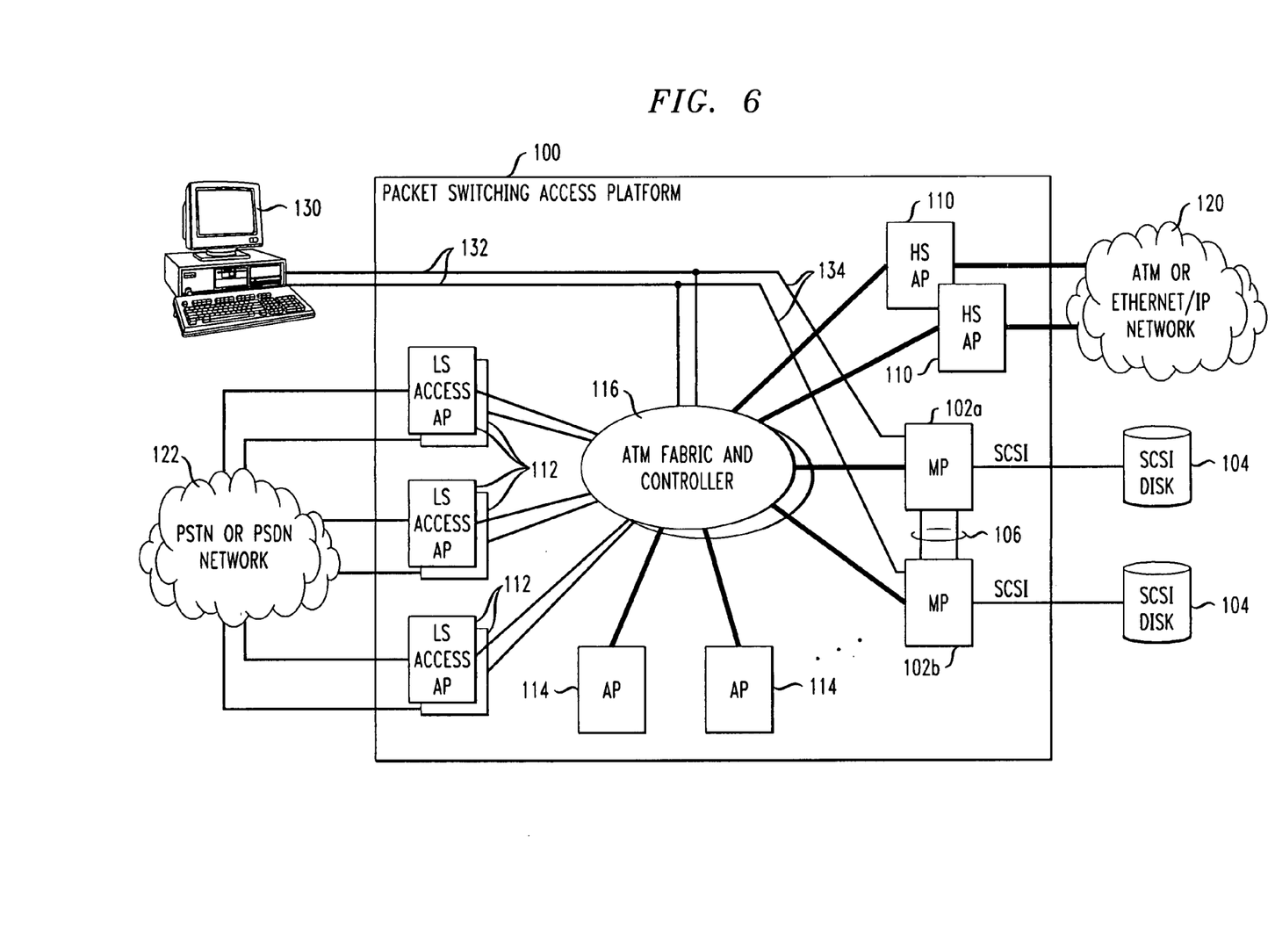
FIG. 6 depicts a fully configured embodiment of a system whereby many of the aspects of the invention are simultaneously illustrated.

Referring now to FIG. 6, a stand-alone configuration of the packet switching access platform 100 is illustrated. In this configuration, primary control of the invention is facilitated by the duplex, fault tolerant application packs described previously as management processors 102. In addition to using the stored program control within the computer memory of this duplex pair, these management processors 102a & 102b utilize small computer system interface (SCSI) disks 104 as a preferred, but not only, embodiment to maintain data and program images to support and control the invention. Fault tolerance of the duplex pair of management processors 102a & 102b is enhanced by the use of the mate update bus 106, used in the cache-write-through mode so that the standby management processor 102b always reflects the state of the active management processor 102a, whereby a failure of the active component allows for an efficient and effective transfer of control to the standby, which then transitions to the role of active.

Primary ingress and egress of data streams to the invention is via the high-speed access application packs 110, connected to an ATM transport or ethernet/IP transport network 120 ultimately connected to other packet switched systems in manners well known in the art. Secondary ingress and egress of data streams are via the low-speed access application packs 112 connected, for example, to the public switched telephone network (PSTN) or the public switched data network (PSDN) 122. Such low-speed connections may be achieved by utilizing, but not limited to, ATM transport (e.g. OC3), Ethernet/IP transport (e.g. Fast Ethernet), or TDM transport (e.g. T1/E1 or DS3).

Manipulation of the data streams carried by the high-speed application packs 110 and low-speed application packs 112 is accomplished by a multitude of application packs 114 which serve as processing elements. Connectivity of specific data streams between any ingress/egress point (e.g. 110 or 112) and a termination point (e.g. 114) is achieved via connections established in the ATM fabric 116 under control of the management processors 102.

Monitoring and maintenance of the system, along with the ability to provide human intervention, is achieved through connectivity to an element management system (EMS) 130 via a duplex, fault tolerant, connection 132. In a more limited aspect of the invention, the connectivity may be achieved via a simplex connection 132, with the fault tolerance of the connectivity commensurately impacted. In another aspect of the invention, such a connection 132 can also be directly connected to the management processors 102 via extension 134 of said connectivity 132.

Figure 7A:
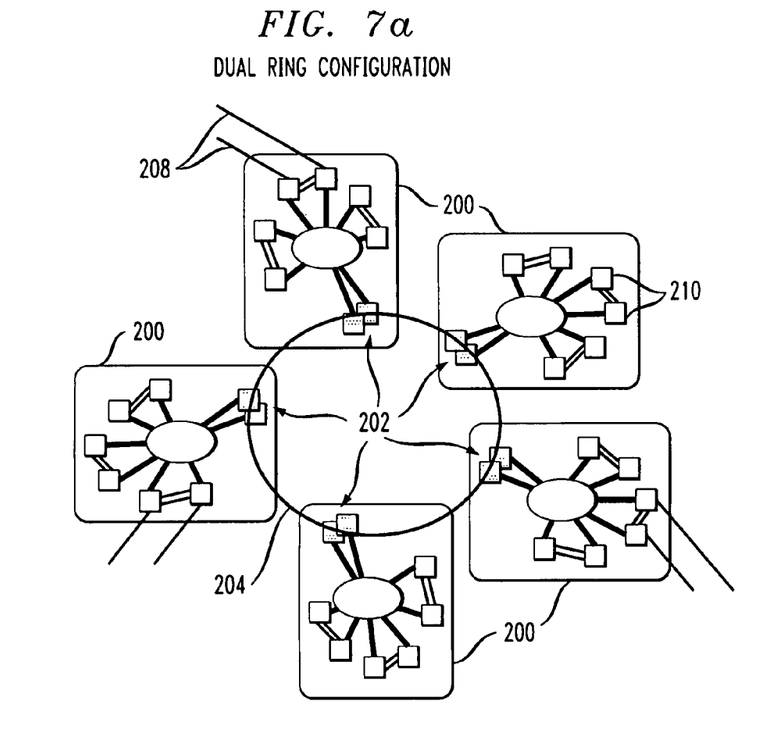
FIGS. 7(a) and (b) demonstrate various configurations in which the invention may be used in a scalable, networked fashion.
Figure 7B:
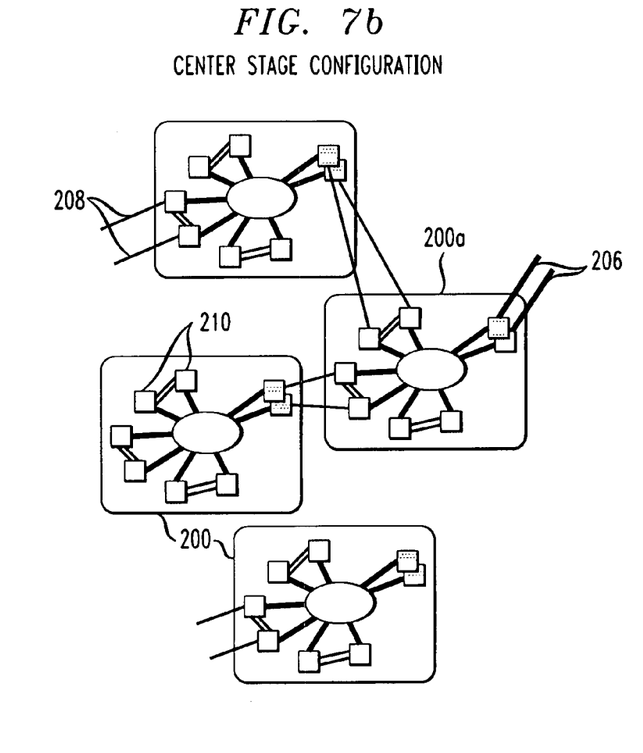

The applicability of the invention to that of a self-contained, scalable, highly fault tolerant, packet switching and access network is demonstrated in FIGS. 7(a) and (b). In FIG. 7(a), a multitude of the subsystems 200 according to the invention is arranged such that the high-speed access interfaces 202 form a dual ring configuration 204. Due to the ability of each node in the network, i.e., the systems 200, to provide a fault tolerant environment, coupled with the inherent fault tolerance found in a dual ring configuration, as is well known in the art, a system is created which is able to withstand multiple faults before a service-affecting failure in the network between elements occurs, such as between the low-speed access 208 and protocol processing 210 elements.

In FIG. 7(b), another arrangement of a multitude of the subsystems 200 according to the present invention is shown. Here, a hierarchy of systems is arranged in such a fashion so as to provide a single, highly fault tolerant, high-speed ingress and egress point 206 to the network system, while still providing a distributed network of low-speed access 208 and protocol processing 210 elements. In such an arrangement, the interconnectivity between the elements in the system is achieved by utilizing the central instantiation of the system 200a to provide such interconnectivity, as well as providing a centralized ingress and egress point 206.

The above description is of one preferred embodiment of the invention. Many other embodiments will be apparent to those of ordinary skill in the art, without departing from the spirit and scope of the invention.

The invention claimed is:

1. An apparatus for use as a packet switching access platform, the apparatus comprising:
   at least one duplex, fault tolerant asynchronous transfer mode (ATM) fabric element;
   a plurality of application packs operative as one of processing elements and access interface elements, connected to the ATM fabric element; and,
   a duplex connection per ATM fabric element, whereby control and/or maintenance functionality is provided from an external source,
   wherein each pair of sequential application packs is connected by a mate update bus, providing for multiple modes via which said sequential pair of application packs may communicate,
   wherein a selected pair of application packs of said plurality of application packs is operative to provide the primary function of ingress and egress to an external packet switched network in a high speed manner, and,
   wherein a selected group of the plurality of said application packs is operative to provide the secondary function of ingress and egress to an external packet switched network or public switched telephone network at data rates lower than those provided by the selected pair.

2. An apparatus as set forth in claim 1 wherein the ATM fabric element is configured in a simplex arrangement, thereby lowering the reliability and lowering the fault tolerance of said system.

3. An apparatus as set forth in claim 1 wherein said connection to the ATM fabric element is utilized for traffic destined for one or more of said application packs in addition to said control and/or maintenance traffic destined for said ATM fabric.

4. An apparatus for use as a packet switching access platform, the apparatus comprising:
   a duplex, fault tolerant asynchronous transfer mode (ATM) fabric;
   a plurality of application packs, operative as one of processing elements and access interface elements, connected in a star configuration; and,
   a duplex connection whereby status and maintenance information is communicated to an element management system (EMS),
   wherein each pair of sequential application packs is connected by a mate update bus, providing for multiple modes via which said sequential pair of application packs may communicate,
   wherein a selected pair of application packs of said plurality of application packs is operative to provide the primary function of ingress and egress to an external packet switched network in a high speed manner,
   wherein a selected group of the plurality of said application packs is operative to provide the secondary function of ingress and egress to an external packet switched network or public switched telephone network at data rates lower than those provided by said selected pair, and,
   wherein a second selected pair of said plurality of application packs is operative as management processors to provide control and data storage for the system.

5. A system for use as an asynchronous transfer mode network, the system comprising:
   a plurality of subsystems, each comprising
   a duplex, fault tolerant asynchronous transfer mode (ATM) fabric element,
   a plurality of application packs operative as processing elements or as access interface elements, connected to the ATM fabric element, and,
   a duplex connection whereby control and/or maintenance functionality is provided from an external source, wherein each pair of sequential application packs is connected by a mate update bus, providing for multiple modes via which said sequential pair of application packs may communicate, wherein a selected pair of application packs of said plurality of application packs is operative to provide the primary function of ingress and egress to an external packet switched network in a high speed manner, wherein a selected group of the plurality of said application packs is operative to provide the secondary function of ingress and egress to an external packet switched network or public switched telephone network at data rates lower than those provided by the selected pair, wherein the selected pair of one of the said plurality of subsystems provides a primary function of interconnection with other selected pairs of said plurality of systems in a dual ring configuration, and, wherein a single failure within a single subsystem, or a multiple of failures not within a single system, causes a reconfiguration in such a fashion as to not reduce the ability of any two elements within the plurality of subsystems to communicate with each other.

6. A system for use as an asynchronous transfer mode network, the system comprising:
   a plurality of subsystems, each comprising
   a duplex, fault tolerant asynchronous transfer mode (ATM) fabric element,
   a plurality of application packs operative as processing elements or as access interface elements, connected to the ATM fabric element, and,
   a duplex connection whereby control and/or maintenance functionality is provided from an external source,
   wherein each pair of sequential application packs is connected by a mate update bus, providing for multiple modes via which said sequential pair of application packs may communicate,
   wherein a selected pair of application packs of said plurality of application packs is operative to provide the primary function of ingress and egress to an external packet switched network in a high speed manner,
   wherein a selected group of the plurality of said application packs is operative to provide the secondary function of ingress and egress to an external packet switched network or public switched telephone network at data rates lower than those provided by the selected pair,
   wherein one subsystem is a center of a hierarchy of subsystems, with the selected pair providing the primary function of ingress and egress to the plurality of systems in a high speed manner,
   wherein others in the plurality of systems are connected to the center system via application packs in the center system serving to connect to the selected pairs such that, in the said plurality of systems, any two elements in the system may communicate with each other, and,
   whereby a single failure within a single subsystem, or a multiple of failures within the plurality of subsystems, does not eliminate the ability for all elements within the said plurality of subsystems to communicate with each other.

7. An apparatus for use as a packet switching access platform, the apparatus comprising:
   an asynchronous transfer mode fabric;
   a plurality of first application packs connected to the asynchronous transfer mode fabric, pairs of the first application packs being defined by mate update buses connected between packs of each pair;
   at least one second application pack positioned to provide high speed access to the fabric by an outside communication network; and,
   a controller positioned to communicate data into and out of the fabric through an ethernet connection.

8. An apparatus for use as a packet switching access platform with an controller interface to a switching component having a packet interface unit, a time slot interchange unit and a control interface unit the apparatus comprising:
   an asynchronous transfer mode fabric;
   a plurality of first application packs connected to the asynchronous transfer mode fabric, pairs of the first application packs being defined by mate update buses connected between packs of each pair;
   at least one second application pack positioned to provide high speed access to the fabric by outside communication networks;
   at least one third application pack positioned to provide low speed access to the fabric by the time slot interchange unit of the switching component; and,
   a controller positioned to communicate with the packet interface unit and the control interface unit of the switching component.

9. The apparatus as set forth in claim 8 wherein the controller communicates with the apparatus through an ethernet interface unit.

10. The apparatus as set forth in claim 8 wherein the controller communicates with the apparatus through an asynchronous transfer mode network.

11. An apparatus for use as a packet switching access platform, the apparatus comprising:
    an asynchronous transfer mode fabric;
    a plurality of first application packs connected to the asynchronous transfer mode fabric, pairs of the first application packs being defined by mate update buses connected between packs of each pair;
    at least one second application pack positioned to provide high speed access to the fabric by outside communication networks;
    at least one third application pack positioned to provide low speed access to the fabric by a public switched telephone network; and,
    a controller positioned to communicate with an element management system.

12. The apparatus as set forth in claim 11 wherein the outside network is an asynchronous transfer mode network.

13. The apparatus as set forth in claim 11 wherein a pair of first application packs are management processors, used to control the apparatus.

14. The apparatus as set forth in claim 13 wherein the management processors communicate with the element management system.

15. The apparatus as set forth in claim 13 wherein the management processors are connected to memory units.

16. A system for use as an asynchronous transfer mode network, the system comprising:
    a first network element comprising
    a first asynchronous transfer mode fabric,
    plurality of first application packs connected to the asynchronous transfer mode fabric to provide low speed access to the fabric, pairs of the first application packs being defined by mate update buses connected between packs of each pair, and
    at least one second application pack positioned to provide high speed access to the fabric;

a second network element comprising
  a second asynchronous transfer mode fabric,
  a plurality of third application packs connected to the asynchronous transfer mode fabric, pairs of the third application packs being defined by mate update buses connected between packs of each pair,
  at least one fourth application pack positioned to provide high speed access to the fabric by the first network element, and,
  at least one fifth application pack positioned to provide low speed access to the fabric.

17. The system as set forth in claim 16 further comprising a third network element comprising
  a third asynchronous transfer mode fabric,
  a plurality of sixth application packs connected to the asynchronous transfer mode fabric, pairs of the sixth application packs being defined by mate update buses connected between packs of each pair, and
  at least one seventh application pack positioned to provide high speed access to the fabric by the first network element.

18. A system for use as an asynchronous transfer mode network, the system comprising:
  a network dual ring communication line; and,
  a plurality of network elements connected to the dual ring communication line, each element comprising
    an asynchronous transfer mode fabric,
    a plurality of first application packs connected to the asynchronous transmission mode fabric, pairs of the first application packs being defined by mate update buses connected between packs of each pair, and
    at least one second application pack positioned to provide high speed access to the fabric through dual ring communication line.

* * * * *